United States Patent [19]
Mohaupt

[11] Patent Number: 6,006,386
[45] Date of Patent: *Dec. 28, 1999

[54] CAPACITIVE TRANSDUCER

[75] Inventor: Udo H. Mohaupt, Cambridge, Canada

[73] Assignee: International Road Dynamics Inc., Saskatchewan, Canada

[*] Notice: This patent is subject to a terminal disclaimer.

[21] Appl. No.: 09/066,462

[22] PCT Filed: Nov. 18, 1996

[86] PCT No.: PCT/CA96/00759

§ 371 Date: Apr. 30, 1998

§ 102(e) Date: Apr. 30, 1998

[87] PCT Pub. No.: WO97/18446

PCT Pub. Date: May 22, 1997

Related U.S. Application Data

[63] Continuation-in-part of application No. PCT/CA96/00759, Nov. 18, 1996.

[30] Foreign Application Priority Data

Nov. 16, 1995 [CA] Canada ..................................... 2163045

[51] Int. Cl.$^6$ ........................................................ G01L 1/16
[52] U.S. Cl. .................................................................. 7/862.68
[58] Field of Search ........................... 73/862.041–862.043, 73/862.046, 862.626, 862.68

[56] References Cited

U.S. PATENT DOCUMENTS

| | | |
|---|---|---|
| 2,975,307 | 3/1961 | Schroeder et al. ........................ 310/6 |
| 3,565,195 | 2/1971 | Miller ...................................... 177/210 |
| 3,678,378 | 7/1972 | Trott et al. . |
| 3,782,486 | 1/1974 | Kuhn et al. . |
| 4,266,263 | 5/1981 | Haberl et al. . |
| 4,793,429 | 12/1988 | Bratton et al. . |
| 4,825,967 | 5/1989 | Sakamoto et al. . |
| 4,913,248 | 4/1990 | Zakai . |
| 5,597,984 | 1/1997 | Mohaupt ............................. 177/210 C |

FOREIGN PATENT DOCUMENTS

| | | |
|---|---|---|
| 901028 | 5/1972 | Canada . |
| 1013779 | 7/1977 | Canada . |
| 1069945 | 1/1980 | Canada . |
| 2182221 | 1/1997 | Canada . |
| 2174359 | 10/1973 | France . |
| 1 916 496 | 11/1969 | Germany . |
| 2 016 428 | 10/1970 | Germany . |
| 41 27 460 | 2/1993 | Germany . |
| 411619 | 6/1934 | United Kingdom . |
| 1453934 | 10/1976 | United Kingdom . |
| WO 94/18529 | 8/1994 | WIPO . |

OTHER PUBLICATIONS

Research Disclosure, May 1987, Havant, GB, pp. 316, 318–319, Disclosed Anonymously, "The capacitive pad sensor".

"Compare Status Accumulator", 27743 Research Disclosure, (1987) May, No. 277, New York.

"The Capacitive Pad Sensor", 27742 Research Disclosure, (1987) May, No. 277, New York.

*Primary Examiner*—Benjamin R. Fuller
*Assistant Examiner*—Jewel V. Thompson
*Attorney, Agent, or Firm*—Nixon & Vanderhye P.C.

[57] ABSTRACT

A capacitance transducer is provided herein for use in measuring loads. It includes a flexible first electrode, a flexible thin film solid dielectric and a fluid dielectric therebetween. A load which is applied to the transducer presses the first electrode, and the thin film dielectric against the second electrode, thereby squeezing out the fluid dielectric to increase the area of the electrodes that are in close proximity. This provides a capacitance transducer that has a significant linear response and an insignificant non-linear response.

42 Claims, 2 Drawing Sheets

CAPACITIVE TRANSDUCER

(2) BACKGROUND OF THE INVENTION (a) Related Inventions

This application is a continuation-in-part of application PCT/CA96/00759 filed Nov. 18, 1996, the entire contents of which are hereby incorporated by reference.

(b) Field of the Invention

This invention relates to the field of capacitance transducers.

(c) Description of the Prior Art

U.S. Pat. No. 3,782,486 discloses a device for sensing and measuring a transient load, e.g., one imposed by at least one wheel on an axle of a passing vehicle. The device comprises a low profile pad or mat comprising three electrode plates which are separated by a dielectric, elastomeric material. Capacitance is established between the central electrode and each of the outside electrodes. The electrodes are connected to a device for detecting variations in the electrode spacing owing to transient loads. Void areas are located in the body of the mat to provide for mat deformation which is proportional to the magnitude of the applied load. The voids may be filled with a gas having particular properties to assist in the provision of the required sensitivity characteristics and compensate for changes of temperature of the mat. The patent describes the need for a portable weight sensing device having the characteristics of (a) portability, (b) simplicity, (c) ruggedness and reliability, (d) insensitivity to location of load and (e) low price.

Canadian Patent No. 1,069,945 discloses a resiliently-flexible sensor mat which includes two spaced-apart, electrically-conductive plates with a dielectric elastomeric sheet material therebetween, and conductive threads embedded in the dielectric layer.

Canadian Patent No. 1,013,779 discloses a resiliently-flexible sensor mat which includes at least two electrically-conductive layers which are separated by a deformable elastomeric layer. The electrically-conductive layers each include ribs thereon facing the deformable elastomeric layer, the ribs which are on opposite sides of the deformable elastomeric layer being disposed to run at an angle which is less than 180 degrees to one another.

Canadian Patent No. 901,028 discloses a weighing mat having at least two electrically-conductive strata which are separated by a deformable elastomeric layer. The electrically-conductive strata each include ribs thereon facing the deformable elastomeric layer, the ribs which are on opposite sides of the deformable elastomeric layer being disposed to run at an angle which is perpendicular to one another.

G.B. Patent No. 1,415,934 discloses a weighing device which consists of a low-sensing transducer which comprises two flat parallel conductor electrodes which are spaced apart by an intervening closed cellular chamber having flexible side walls, which provide air spaces between the spaced-apart parallel plates.

U.S. Pat. No. 3,678,378 discloses a capacitor which includes at least two spaced-apart perforated metallic electrodes with a sheet of resilient imperforate material therebetween. Such sheet of resilient imperforate material forms air space cavities when force is applied to the capacitor.

U.S. Pat. No. 4,266,263 discloses a capacitor which comprises at least two electrodes which are separated by a deformable elastomeric layer. That elastomeric layer includes a plurality of hollow spaces therein to improve its compressibility.

U.S. Pat. No. 4,793,429 discloses a WIM mat which includes two electrodes which are separated by a piezoelectric material.

A non-patent reference is Research Disclosure No. 277, May 1987, Havant GB, pages 318–319, XPOO2023858, Disclosed Anonymously: "The Capacitive Pad Sensor", Here the dielectric of the capacitor consists of air and of a preferably temperature insensitive, elastic material like silicon. This document merely discloses a capacitance pad sensor which includes two electrode plates which are separate by a central plate, and in which there is an air space between each adjacent plate.

WO-A-94/18529 discloses a device which combines bending plate theory with capacitance theory to produce a mat for weighing vehicles. Capacitance change is measured between electrode plates during loading and is used to provide a signal data to a computer which can then calculate the weight of the vehicle. Under loading, the normally flat plates bend sinusoidally to, and from, one another over rigid rib-like fulcrums, which are spaced apart in rows between each pair of plates in the capacitor stack, each such row being offset from the row next below or above it to promote such sinusoidal bending. Bending changes the distance between the plates which changes the capacitance.

G.B. Patent 411619 discloses a variable condenser comprising a thin flexible plate electrode of sinusoidal cross-section resting on a dielectric plate and which is sandwiched between two flat plates.

DE 4127460 A discloses a sensor comprising a central plate and a pair of outer thin flexible plates which are bent and affixed to the central plate. The outer plates are each provided with a thin metal layer facing the central plate, and the central plate is also provided with a thin metal layer facing the outer plates. There is an arrangement for the measurement of the capacitance by means of such thin metal layers.

Japanese Patent No. 8247833 discloses a weighing scale which has a non-conductive elastomer sandwiched between an up-down electrically conductive sheet. The measurement mat changes the capacitance through the application of pressure between the up-down electrode and the non-conductive elastomer.

Canadian Patent No. 2,182,221 discloses a pressure sensor comprising a pair of electrodes and a rubber elastomer dielectric layer therebetween, the dielectric layers being discontinuous.

All of these transducers have different types of elastomeric dielectric materials. All measure a load using the change in the capacitance of the transducer caused by compression of the dielectric.

Capacitance transducers using elastomeric dielectric materials may have a non-linear response and significant hysteresis under a variety of conditions and loads. Tests on such mats suggest that the cause is that the dielectric properties of the combination of expansion gaps (or air holes) and elastomeric material between the electrodes may vary in a non-linear manner under compression, that elasticity of the material may be temperature dependent and that there may be memory effects in elastomeric material when loads are applied in rapid succession.

Applicant's prior U.S. Pat. No. 5,597,984, discloses a construction for an improved capacitance transducer which does not rely upon compression of elastomeric dielectric materials to change the capacitance. Instead, that invention employs a novel principle of bending electrode plates in synchronous opposition over a plurality of substantially rigid dielectric separators to create a plurality of areas of closer plurality between the plates to effect capacitance changes. The improvements brought about by eliminating the compressible dielectric of the prior art are limited by an inherent characteristic of this kind of capacitor. Capacitance "C" is directly and linearly related to the area "A" of the opposing electrodes of a capacitor, but it is inversely and non-linearly related to the distance "T" between the electrodes. (C" approaches infinity as "t" approaches 0.) The electrodes of this type of capacitor, including the prior art devices discussed above, have constant areas. The measurand "C" of such capacitors changes in response to deflection of "T" by an applied load. Thus, such capacitors are inherently non-linear.

(3) SUMMARY OF THE INVENTION (a) Aims of the Invention

The principal object of this invention is to provide a capacitance transducer using the opposed bending electrode principle disclosed in the above-identified U.S. Pat. No. 5,597,984 of the applicant, but having an improvement in a novel construction of the center electrode and its relationship to the outside electrodes with the objects to increase linearity, reduce weight, and size and lower manufacturing costs.

(b) Statement of Invention

The present invention broadly provides a capacitance transducer comprising: a first electrode and a second electrode, the second electrode comprising a dielectric plate which includes a plurality of separate electrodes thereon, which consist of a plurality of transversely-spaced-apart, longitudinally-extending strips of electrically-conducting material, the first electrode and the second electrode having overlapping surface areas which are spaced apart by a first rigid dielectric and by a second fluid dielectric; and means for orienting the first electrode with respect to the second electrode so that increasing force which is applied to the transducer resiliently presses an increasing portion of overlapping surface areas of the first electrode and the second electrode into closer proximity while being separated by the first rigid dielectric while substantially removing the second fluid dielectric from areas of close proximity, thereby to cause a capacitance response that depends significantly on the size of the areas which are pressed together relative to any capacitance response resulting from a change in the spacing of the electrodes; thereby to provide a capacitance transducer that has a significant linear response and an insignificant non-linear response.

The present invention also provides a capacitance transducer comprising: a first electrode and a second electrode, the second electrode comprising a dielectric plate which includes a plurality of separate electrodes thereon, which consist of a plurality of transversely-spaced-apart, longitudinally-extending strips of electrically-conducting material, the first electrode and the second electrode having overlapping surface areas which are spaced apart by a first rigid dielectric and by a second fluid dielectric; and means for orienting the first electrode with respect to the second electrode so that increasing force which is applied to the transducer resiliently presses an increasing portion of overlapping surface areas of the first electrode and the second electrode into closer proximity while being separated by the first rigid dielectric while substantially removing the second fluid dielectric from areas of close proximity, thereby to cause a capacitance response that depends significantly on the size of the areas which are pressed together relative to any capacitance response resulting from a change in the spacing of the electrodes; wherein portions of the first electrode which are not pressed close to the second electrode are farther from the second electrode, the further portions being separated from the second electrode by the rigid electrode and also by the second fluid dielectric that occupies the space between the electrodes; thereby to provide a capacitance transducer that has a significant linear response and an insignificant non-linear response.

(c) Other Features of the Invention

By one feature thereof, one or both of the first electrode and the second electrode are flexible, thereby to enable them to press together.

By another feature thereof, the first electrode and the second electrode have two opposing portions which are inclined with respect to one another, whereby an increasingly-greater area is produced as the electrodes are pressed together and deflect towards one another. By a special feature of that feature, the inclined portions are provided by appropriate selection of material and dimensions of one or both of the first electrode and the second electrode to cause a linear increase in the effective area as the electrodes are pressed together and deflect towards one another.

By yet another feature thereof, one or both of the first electrode and the second electrode are constructed to bend towards the other, whereby oppositely-bending curves of each are pressed increasingly together by compression.

By still a further feature thereof, the first electrode and the second electrode are constructed from different materials, and thereby have different physical characteristics. By a special feature of that feature, the first electrode comprises a thin copper sheet, and the second electrode comprises a sheet of aluminum having greater strength and thickness.

By a further feature thereof, the first rigid dielectric comprises a thin sheet of dielectric material, the thickness of the thin sheet of dielectric material being less than the distance between the first electrode and the second electrode. By one special feature of that feature, the solid dielectric has a substantially-constant thickness. By another special feature of that feature, the solid dielectric has a gradual change in thickness, thereby creating a desired effect on capacitance to balance or offset another undesired effect. By yet another special feature of that feature, the solid dielectric is bonded to the first electrode or to the second electrode. By still another special feature of that feature, the solid dielectric comprises a thin flexible sheet of synthetic plastics material on which a thin film of copper has been deposited, thereby to form the first electrode. By a still further special feature of that feature, the first electrode is then etched.

By another feature thereof, the second dielectric occupies the space between the first electrode, the second electrode and the solid dielectric when the first electrode and the second electrode are not pressed together, and the second dielectric comprises a fluid, whereby it may move into and out of the space as the first electrode and the second electrode deflect and resiliently deform. By a special feature of that feature, the second dielectric comprises air.

By yet still a further feature thereof, the capacitor transducer comprises a closed chamber. By a special feature of that feature, the second dielectric comprises a compressible fluid, thereby to accommodate to any volume change which results from deflection of the first electrode and the second electrode. By a further special feature of that feature, the second dielectric comprises a vacuum.

By yet another feature thereof, the first electrode and the second electrode comprise a part of a plurality of the first electrode and the second electrode.

The present invention also provides a capacitance mat for use in measuring loads, the mat comprising a vertically-stacked sandwich of at least a pair of vertically-spaced-apart, first and second electrode plates forming a capacitor, a lower one of the electrode plates comprising a laminate of an insulator dielectric substrate and a thin electrode coating the thin electrode coating comprising a plurality of separate electrodes consisting of a plurality of transversely-spaced-apart, longitudinally-extending strips of electrically-conducting material, the first electrode, each adjacent pair of the vertically-spaced apart, electrode plates being separated by a plurality of laterally-spaced-apart, substantially-rigid, dielectric material separator strips which are disposed between the stack of a pair of vertically-spaced-apart, electrode plates, the substantially-rigid dielectric material separator strips being offset in different levels of the vertically-stacked sandwich, and being disposed to run parallel to one another in the different levels of the vertically-stacked sandwich and by a second fluid dielectric, the rigid electric material separator strips thereby defining spaces into which at least one of the electrode plates may bend in response to an applied load, so that selected portions of the insulator dielectric substrate are in contact with the substantially-horizontal electrode plate which is immediately above it in response to that applied load, whereby the lower electrode is pressed against the upper electrode, causing the capacitance of the mat to change; thereby to provide a capacitance transducer mat that has a significant linear response and an insignificant non-linear response.

By one feature of that capacitance mat, one or both of the first electrode plate and the second electrode plate are flexible, thereby to enable them to press together. By a special feature of that feature, the first electrode plate and the second electrode plate have two opposing portions which are inclined with respect to one another whereby an increasingly-greater area is produced as the electrode plates are pressed together and deflect towards one another. By yet another special feature of that feature, the inclined portions are provided by appropriate selection of material and dimensions of one or both of the first electrode and the second electrode to cause a linear increase in the effective area as the electrodes are pressed together and deflect towards one another.

By another feature of that capacitance mat, one or both of the first electrode plate and the second electrode plate are constructed to bend towards the other, whereby oppositely-bending curves of each are pressed increasingly together by compression.

By yet another feature of that capacitance mat, the first electrode plate and the second electrode plate are constructed from different materials and thereby have different physical characteristics.

By still another feature of that capacitance mat, the first electrode plate comprises a thin copper sheet, and the second electrode plate comprises a sheet of aluminum having greater strength and thickness.

By still a further feature of that capacitance mat, the insulator dielectric substrate comprises a thin sheet of dielectric material, the thickness of the thin sheet of dielectric material being smaller than the distance between the first electrode and the second electrode. By one special feature of that feature, the insulator dielectric substrate has a substantially-constant thickness. By another special feature of that feature, the insulator dielectric substrate has a gradual change in thickness, thereby creating a desired effect on capacitance to balance or offset another effect.

By yet a further feature of that capacitance mat, the lower one of the electrode plates comprises a thin flexible sheet of synthetic plastics material on which a thin film of copper has been deposited. By a special feature of that feature, the shape of the first electrode is then etched.

By a still further feature of that capacitance mat, the second dielectric occupies the space between the first electrode plate and the second electrode plate/insulator dielectric substrate when the first electrode plate and the second electrode plate are not pressed together, and the second dielectric may move into and out of that space as the first electrode and the second electrode deflect and resiliently deform. By a special feature of that feature, the second dielectric comprises air.

By yet a further feature of that capacitance mat, the capacitor transducer mat comprises a closed chamber. By one special feature of that feature, the second fluid dielectric comprises a compressible fluid, thereby to accommodate to any volume change which results from deflection of the first electrode and the second electrode. By yet a further special feature of that feature, the second dielectric comprises a vacuum.

(d) Generalized Description of the Invention

The principle of this invention is to cause deflection of stacked electrodes to change the effective area "A" of the capacitor to obtain a significant linear response in "C" and to reduce the non-linear effect on "C" caused the change in "T" to a relatively insignificant amount. This principle may be implemented by making a first electrode resiliently press as an increasing amount of its area and a corresponding area of a solid dielectric against a second electrode as the electrodes are compressed together. This creates a capacitance response that is dependant on the size of areas which are pressed together (the "effective area"), which is not inherently non-linear. The portions of the first electrode that is not pressed close to the second electrode are farther from the second electrode, and, thus, have a less significant effect per unit of area on the overall capacitance. Those farther portions are separated from the second electrode not only by the solid dielectric, but also by a second dielectric that occupies the additional space between the electrodes. Two dielectrics in series have the effect of two capacitors in series which reduces their combined capacitance to less than the capacitance of either of them; the significance of these portions to the overall capacitance is further reduced. Thus, a transducer may be constructed that has a significant response and an insignificant non-linear response.

The novel structure operates on a principle which is similar to that of the applicant's above-identified U.S. Pat. No. 5,597,984, but with a significant change to improve linearity of the change in capacitance relative to deflection under loading.

The outside plates remain as simple flat metal plates. The inner capacitor plate is now a compound sheet having a thin electrode coating over a flexible, thin, substantially-incompressible, insulator substrate. This is a novel element. This inner plate is also not flat when mounted into the capacitor. It is mounted sinuously to bend to and from the upper plate with its insulator side pressing against the upper plate, even in the no load situation. The capacitance is measured between the upper plate and the electrode coating on the insulator substrate. Thus, at the point of contact of the insulator substrate and the upper plate, the distance between the electrode coating and the upper plate is very close and dominates the total capacitance reading. In other words, the effect on the total capacitance of the portions of the inner plate which are not contacting the upper plate is negligible.

Under loading, the rigid rib structure induces bending of the plates, but with an entirely different effect. As load is applied and the upper plate is bent down, the contact area of the insulating substrate increases proportionally to the deflection. In other words, as the upper plate descends, the more flexible thin inner plate (electrode and insulator) flattens out at the top of the curvature (for each of its curves) against the upper plate. The increase in the area in close proximity increases the capacitance. The effect of the other portions not in contact is again essentially negligible.

Consequently, in this structure, the capacitance varies proportionally to the area of contact rather than the net distance between the plates. The effect of the net distance on capacitance becomes insignificant compared to the area effect given the uniform distance and very close proximity in the contact area (one thickness of the insulator substrate). Since capacitance varies linearly with area but non-linearly with distance between the plates, the second structure is inherently more linear. By shaping the curves and the material characteristics to cause the contact area to vary linearly with deflection, a linear output is obtained. It is also an improvement because it is also inherently independent of the size of the "footprint" of the load or of "edge effects". Further, vulnerability to electrical noise is very insignificantly reduced by the close and uniform proximity, while at the same time, the scale is much more sensitive to applied loads. Calibration adjustments of the scale components are possible during manufacture. It is also extremely versatile and capable of being used for the manufacture of other transducers for the measurement of applied forces. By varying materials and structure slightly, it can be made to weigh almost any size load, both statically and dynamically.

A person skilled in the art will now appreciate from this general description of how to implement the principle of this invention that it may be carried out in a wide variety of embodiments for many end uses. It will be apparent also that a very great number of selections are possible from suitable materials of various dimensions to achieve specific results for any particular application. Of course, "significant" and "insignificant" will have meanings peculiar to specific applications. The following paragraphs will attempt to assist a skilled person to make suitable selections.

One or both of the first and second electrodes may be flexible to enable them to press together resiliently. The two electrodes may have opposing portions that are inclined with respect to one another so that an increasingly greater area is pressed together as the electrodes deflect towards one another. One or both of them may be constructed to bend towards the other so that oppositely bending curves of each are pressed increasingly together by the compression. The inclinations or curvature may be established with appropriate selections of materials and dimensions to cause a linear increase in the effective area. The first and second electrodes may be part of a stack of a plurality of such electrodes. The first and second electrodes may be made from different materials and may have different physical characteristics; e.g., in a preferred embodiment, the first electrode is a very thin copper sheet, while the second electrode is a sheet of aluminum of relatively much greater strength and thickness.

The solid dielectric may be a thin sheet in the sense that its thickness will usually be much smaller than the distance between the electrodes generally. It will usually have a constant thickness, although a gradual change in thickness could be used to create a desired effect on the capacitance, e.g., to balance or offset another undesired effect. It may be bonded to the first or the second electrode; e.g., in a preferred embodiment the solid dielectric is a thin flexible plastic sheet on which a thin film of copper is deposited to form the flat electrode. The shape of the first electrode may then be etched using techniques which are standard to electrical circuit board construction. Ordinarily, under the focus produced by the electrodes pressing together, it will not compress to an extent that it will significantly effect the capacitance of the transducer.

The second dielectric will occupy the space between the electrodes and the solid dielectric when they are not pressed together. It will normally be a fluid so that it may move into or out of such space as the electrodes deflect and resiliently reform. In a closed chamber construction of the capacitor, the second dielectric may be a compressible fluid to accommodate to any volume change resulting from deflection of the electrodes. It may be nothing, i.e., a vacuum. In a preferred embodiment, the second dielectric is air.

The capacitance of this invention may be constructed as a scale to weigh loads or as a load cell to measure forces. In the latter type of embodiments, it may be preferred to prestress or otherwise bias the transducer so that it may measure application of tension or compression. It will be appreciated that it is particularly adaptable as an improvement to the weigh scale described in applicant's above-identified U.S. Pat. No. 5,597,984.

The capacitance transducer in applicant's above-identified U.S. Pat. No. 5,597,984 comprises a plurality of stacked electrodes which are spaced apart by a plurality of substantially-incompressible dielectric fulcrums about which adjacent electrodes can bend under loading. "Substantially" in this context means that the capacitance of the mat is not significantly altered during loading by compression of the dielectric fulcrums. The dielectric fulcrums define spaces of predetermined vertical and horizontal dimensions between adjacent electrodes under no load conditions. The electrodes bend into these spaces about the dielectric fulcrums when a load is applied to the transducer. The vertical dimension of the spaces may be determined in part by the expected vertical deflection of the electrodes during bending. The horizontal spacing may be determined in part by the bending characteristics of the electrode material and the shape of the bend which one wishes to form in the electrode under loading conditions.

The dielectric fulcrums are offset at different layers, i.e., fulcrums in an upper layer lie over the spaces between the fulcrums in a next lower layer to promote bending of the electrode between them under loading conditions. Fulcrums of different layers create bending moments on the electrode plates. When a load is applied to an area of the transducer, the load and the resistance to the load under the transducer are transmitted through the electrodes and the fulcrums to bend the electrode plates in a sinuous, undulating or wave-like form towards and away form each other. The improvement of the present invention may be incorporated by replacing a central electrode plate with a flexible electrode and a solid dielectric. The dielectric fulcrums may be realigned to support the outside electrodes plates against each other for bending on either side of the central electrode and additional dielectric fulcrums may be added to shape the bend of the central electrode. The description of the preferred embodiment below will help illustrate the construction of this type of transducer and assist a skilled person to construct other embodiments that use the principle of this invention.

(4) BRIEF DESCRIPTION OF THE DRAWINGS

In the accompanying drawings.

In the figures which illustrate preferred embodiments of this invention.

(5) DESCRIPTION OF THE PREFERRED EMBODIMENTS

Figure 1:
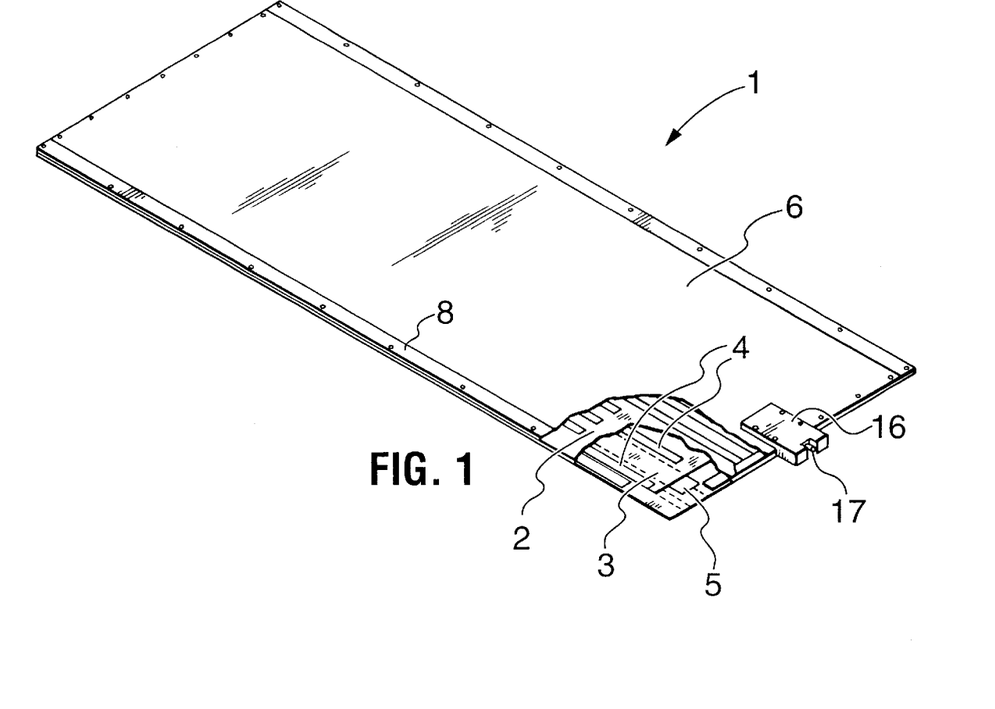
FIG. 1 is a breakaway illustration of a two electrode transducer mat.
Figure 2:
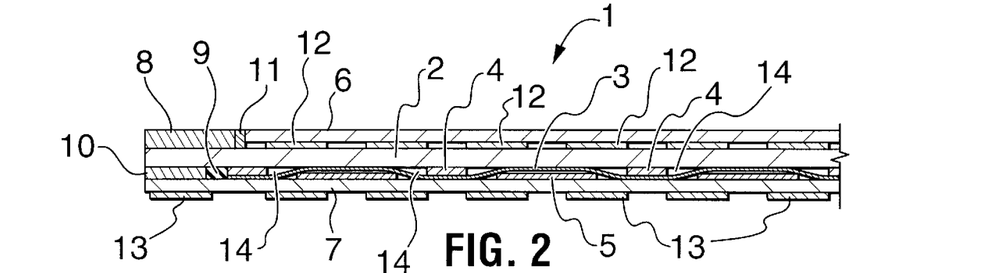
FIG. 2 is a sectional view across the width of the mat of FIG. 1.

The basic elements of this invention are shown in the breakaway view of FIGS. 1 and 2. A transducer mat (1) of this invention comprises a top electrode (2), an electric coated dielectric (3) having a thin film flexible solid dielectric coated on its underside with a copper electrode, upper dielectric strip (5). Capacitance is established between the top electrode plate (2) and the copper electrode across the solid flexible film of dielectric of the electrode coated dielectric (3).

The transducer (1) is contained within a top plate (6) and a bottom plate (7) and is seated about its edges by strips (8), O-ring (9) strips (10) and sealant (11). These may be required to seal the transducer (1) from the environment, but the construction of same will be determined by the anticipated use is within the skill of the art and not particularly material to the essence of the invention. The top plate (6) receives an externally-applied load.

The fulcrums (12) between the top plate (6) and the top electrode (2) transmit an externally-applied load to the top electrode (2) to bend it downwards over the dielectric fulcrums (4). The spacing and width, of the fulcrums (12) helps to shape the bend in top electrode (2). The fulcrums (13) under the lower plate (7) rest on a base and transmit the resistance to the load to bend the lower plate (7) upwards. Their spacing and width also helps to shape the bend in lower plate (7). During bending, the lower plate (7) and the dielectric fulcrums (5) press the electrode coated dielectric (3) upwards towards the downward bending top electrode (2). The pressing causes the flexible, electrode-coated dielectric (3) to increase its area of contact with the top electrode (2) bringing the two electrodes into close proximity (separated only by the thin dielectric film) throughout this area of contact. The distance between the electrodes is a constant which is determined by the thickness of the thin film dielectric. The capacitance which is established between the copper coated underside and the top electrode (2) across the thin film of solid flexible dielectric thus changes in response to the increase (or decrease) in the area of close proximity of the two electrodes.

The interior space (15) of the transducer is filled with a gas, preferably air, which flows away or back from the areas closing or opening contact. When air is interposed between the electrode coated dielectric (3) and the top electrode (2), the capacitance is reduced not only by the increased distance between the electrodes, but also by the two dielectrics in series acting like two capacitors in series reducing the capacitance of both to an amount less than the capacitance of either one. The effect becomes more significant as the two electrodes curve away from one another to increase their separation. In this manner the capacitance can be made to depend significantly on the area of close proximity of the electrodes and to depend insignificantly on the distance between the electrodes where they are not in close proximity.

The electrode coated dielectric (3) may be etched in a manner known in circuit board manufacture to create a pattern of electrode coating on the thin dielectric film. Thus, the electrode coating may be restricted to the area over fulcrum (5) to eliminate effects in areas of insignificance to increasing and decreasing areas of close proximity. Therefore, only the dielectric film touches plate (7) under the fulcrums (4).

An oscillator and known associated circuitry for causing the oscillator to vary its count in response to variance in the capacitance may be contained in a box (16) which is connected to the transducer (1) in a known manner, e.g., disclosed in applicant's above-identified U.S. Pat. No. 5,597,984. A connection (17) for a cable (not shown) is provided to remove data about the count to computation devices to determine a measurement of the load in a known manner.

The top and bottom electrode plates (6) and (7) may be grounded to reduce noise. The electrode coating on the electrode coated dielectric (3) is charged. The top electrode plate (2) and the upper and lower plates may be constructed of thin, high strength aluminum, or other suitable materials which provide conductivity (in the case of the electrode), durability and bending strength. Each plate has approximately the same area so that they substantially overlay one another to construct a capacitor transducer. As shown in FIG. 2, however, the dimensions may be slightly different for other purposes, e.g., of sealing the edges. Each plate may be about 80 thousandths of an inch thick and formed of high strength aluminum 6065-T6.

As illustrated in FIGS. 1 and 2, the dielectric fulcrum strips are laid parallel and spaced apart in layers between the plates. The strips may be made of any substantially rigid dielectric material, e.g., nylon. It is preferred, however, to use FIBREGLASS™ because of its greater insensitivity to temperature changes. The dielectric strips are about $\frac{1}{32}$ of an inch thick and stretch across the length of the mat. They are glued to the electrodes with a suitable adhesive such as an epoxy adhesive.

The tolerance for variation in the thickness of the mat (1) is very low, about plus or minus 1,000th of an inch. In one example, that amount of variation resulted in an error of about plus or minus 1½%.

Figure 3:
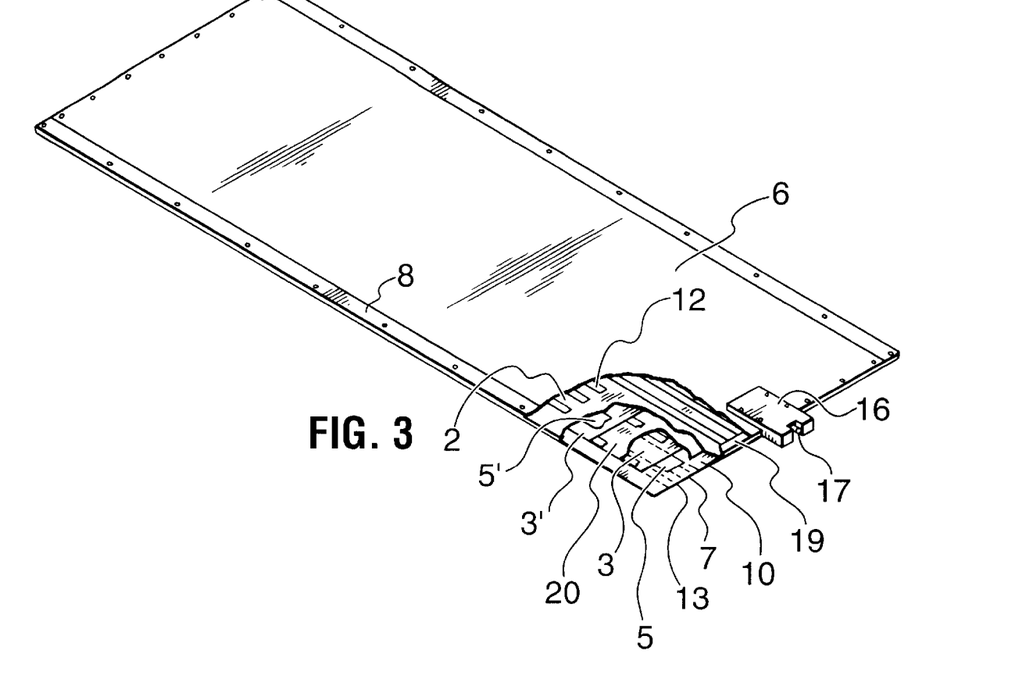
FIG. 3 is a breakaway illustration of a three electrode transducer mat.
Figure 4:
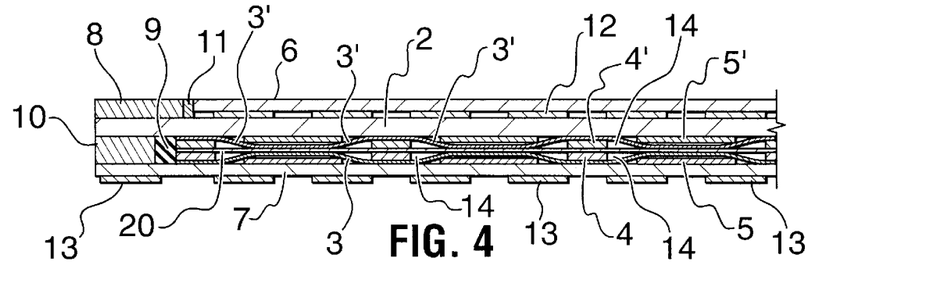
FIG. 4 is a cross-section across the width of the mat of FIG. 3.
Figure 5:
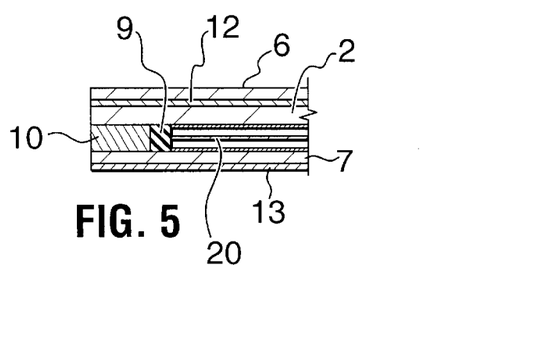
FIG. 5 is an enlarged cross-section taken across the length near one end showing the end sealing means of the embodiment shown in FIG. 4.

FIGS. 3, 4 and 5 illustrate another embodiment of this invention in which two such capacitors are stacked in series about a common central electrode. For the purposes of comparison to the previous embodiment the same numbers will be used for similar elements of the first capacitor and prime numbers for the elements of the second capacitor. The elements are shown in the breakaway view of FIGS. 3 and in the cross-section of FIG. 4. This embodiment has a first bending plate (2) [which is not an electrode in this embodiment], a first set of dielectric strips (5'), a first electrode coated dielectric (3') with the copper side facing upwards, a first set of dielectric fulcrum strips (4'), a central electrode (20), a second electrode coated dielectric (3) with the copper side facing downwards, a second set of dielectric fulcrums (4) and a second set of dielectric strip (5) and a lower ending plate (7). Capacitance is established between the central electrode (20) and the electrode coating on the electrode coated dielectrics (3) and (3'). The transducer is contained within a top plate (9) and the bottom plate (7) and is sealed about its edges by strips (8), O-ring (9), strips (10) and sealant (11). The top plate (9) receives an externally-applied load. Fulcrums (12) between the top plate (6) and the top bending plate (2) transmit an externally-applied load to bend the plate (2) downwards between the dielectric fulcrums (4'). The spacing and width of the fulcrums (12) helps to shape the bend in plate (2). The fulcrums (13) under the lower plate (7) rest on a base and transmit the resistance to the load to bend the lower plate (7) and the dielectric fulcrums (5') and (5) press the electrode coated dielectrics (3') and (3) towards the central electrode (20) to increase its area of contact between the electrodes across the thin films of dielectric separating them. The capacitance thus changes in response to the increase (or decrease) in the area of close proximity of the two electrodes in manner similar to that described above for the previous embodiment. The interior space (14) of the transducer is filled with a gas, preferably air, which flows away or back from the areas closing or opening contact. In a manner similar to that described for the previous embodiment, the capacitance can be made to depend significantly on the area of close proximity of the electrodes and to depend insignificantly on the distance between the electrodes where they are not in close proximity.

FIG. 5 shows the end sealing arrangement. As before, the transducer is contained within a top plate (6) and a bottom plate (7) and is sealed about its edges by strips (8), O-ring (9), spacer bar (10) set in silicone caulking and a sealant (11).

In this description and in the claims, words indicating a direction or orientation like "upper" or "lower" are used for the purposes of explanation, but is not intended that the parts must have that orientation during operation. The transducers in the Figures illustrated as having many repeating cells, for example, in FIG. 2, each portion o the electrode coated dielectric extending over a fulcrum 5 acts as a separate cell.

(6) CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A capacitance transducer comprising:

a first electrode;

a second electrode, said second electrode comprising a dielectric plate including a plurality of separate electrodes thereon, said separate electrodes consisting of a plurality of transversely-spaced-apart, longitudinally-extending strips of electrically-conducting material, wherein said first electrode and said second electrode have overlapping surface areas;

a plurality of transversely-spaced-apart, longitudinally-extending first solid dielectric strips which are disposed between said first electrode and said second electrode; and a second fluid dielectric which is also disposed between said first electrode and said second electrode;

said first electrode and said second electrode being so-oriented that increasing force which is applied to said transducer resiliently presses an increasing portion of said overlapping surface areas of said first electrode and said second electrode into close proximity, but which are separated by said first solid dielectric strips, while substantially-simultaneously removing said second fluid dielectric from areas of close proximity, thereby to cause a capacitance response that depends significantly on the size of areas which are pressed together relative to any capacitance response resulting from a change in the spacing of said first electrode and said second electrode.

2. A capacitance transducer comprising:

a first electrode;

a second electrode, said second electrode comprising a dielectric plate including a plurality of separate electrodes thereon, said separate electrodes consisting of a plurality of transversely-spaced-apart, longitudinally-extending strips of electrically-conducting material, wherein said first electrode and said second electrode have overlapping surface areas;

a plurality of transversely-spaced-apart, longitudinally-extending first rigid dielectric strips which are disposed between said first electrode and said second electrode;

a second fluid dielectric which is also disposed between said first electrode and said second electrode; and means for orienting said first electrode with respect to said second electrode so that increasing force which is applied to said transducer resiliently presses an increasing portion of said overlapping surface areas of said first electrode and said second electrode into closer proximity, while being separated by said first rigid dielectric strips, and while substantially-simultaneously removing said second fluid dielectric from areas of close proximity, thereby to cause a capacitance response that depends significantly on the size of said areas which are pressed together relative to any capacitance response resulting from a change in said spacing of said electrodes;

thereby to provide a capacitance transducer that has a significant linear response and an insignificant non-linear response.

3. A capacitance transducer comprising:

a first electrode;

a second electrode, said second electrode comprising a dielectric plate which includes a plurality of separate electrodes thereon, said separate electrodes consisting of a plurality of transversely-spaced-apart, longitudinally-extending strips of electrically-conducting material, wherein said first electrode and said second electrode have overlapping surface areas;

a plurality of transversely-spaced-apart, longitudinally-extending first rigid dielectric strips which are disposed between said first electrode and said second electrode;

a second fluid dielectric which is also disposed between said first electrode and said second electrode; and means for orienting said first electrode with respect to said second electrode so that increasing force which is applied to said transducer resiliently presses an increasing portion of overlapping surface areas of said first electrode and said second electrode into closer proximity while being separated by said first rigid dielectric strips, and while substantially-simultaneously removing said second fluid dielectric from areas of close proximity, thereby to cause a capacitance response that depends significantly on the size of the areas which are pressed together relative to any capacitance response resulting from a change in said spacing of the electrodes, and wherein portions of said first electrode which are not pressed close to said second electrode are farther from said second electrode, said further portions being separated from said second electrode both by said rigid dielectric strips and by said second fluid dielectric that occupies said space between said electrodes;

thereby to provide a capacitance transducer that has a significant linear response and an insignificant non-linear response.

4. The capacitance transducer according to claim 3 wherein one or both of said first electrode and said second electrode are flexible, thereby to enable them to deflect to press together.

5. The capacitance transducer according to claim 3 wherein said first electrode and said second electrode have two opposing portions which are inclined with respect to one another, whereby an increasingly-greater area is produced as said electrodes are pressed together and deflect towards one another.

6. The capacitance transducer according to claim 5 wherein said inclined portions are provided by appropriate selection of material and dimensions of one or both of said first electrode and said second electrode to cause a linear increase in the effective area as said electrodes are pressed together and deflect towards one another.

7. The capacitance transducer according to claim 3 wherein one or both of said first electrode and said second electrode are constructed to bend towards one another, whereby oppositely-bending curves of each are pressed increasingly together by compression.

8. The capacitance transducer according to claim 3 wherein said first electrode and said second electrode are constructed from different materials, and thereby have different physical characteristics.

9. The capacitance transducer according to claim 8, wherein said first electrode comprises a thin sheet of aluminum, and wherein said second electrode comprises a sheet of flexible, thin, substantially-incompressible insulation material whose underside is coated with a plurality of transversely-spaced-apart, longitudinally-extending strips of copper.

10. The capacitance transducer according to claim 3, wherein said first rigid dielectric comprises thin transversely-spaced-apart strips of dielectric material, the thickness of said thin strips of dielectric material being less than the distance between said first electrode and said second electrode.

11. The capacitance transducer according to claim 9 wherein said solid flexible, thin, substantially-incompressible insulator material comprises nylon which has a gradual change in thickness, thereby creating an effect on capacitance to balance or offset another effect.

12. The capacitance transducer according to claim 9, wherein said solid flexible, thin, substantially-incompressible insulator material comprises fiberglass which has a gradual change in thickness, thereby creating an effect on capacitance to balance or offset another effect.

13. The capacitance transducer according to claim 10, wherein said first electrode or said second electrode are bonded to said flexible, thin, substantially-incompressible insulator material.

14. The capacitance transducer according to claim 3 wherein said second electrode comprises a thin flexible sheet of synthetic plastics material on which a thin film of copper has been deposited, and the transverse spaces between said electrode strips are then etched.

15. The capacitance transducer according to claim 3 wherein said second fluid dielectric occupies the space between said first electrode, between said second electrode and between said first rigid dielectric when said first electrode and said second electrode are not pressed together; and wherein said second fluid dielectric may move into and out of said space as said first electrode and said second electrode deflect and resiliently deform.

16. The capacitance transducer according to claim 3, wherein said capacitance transducer comprises a closed chamber.

17. The capacitance transducer according to claim 16, wherein said second fluid dielectric comprises air.

18. The capacitance transducer according to claim 16, wherein said second fluid dielectric comprises a compressible fluid, thereby to accommodate for any volume change which results from deflection of said first electrode and said second electrode.

19. The capacitance transducer according to claim 16, wherein said second fluid dielectric comprises a vacuum.

20. The capacitance transducer according to claim 3 wherein said first electrode and said second electrode comprise one set of a plurality of sets of said first electrode and said second electrode.

21. A capacitance mat for use in measuring loads, comprising:

a vertically-stacked sandwich of at least a pair of vertically-spaced-apart, first electrode plate and second electrode plate forming a capacitor, a lower one of said first electrode plate and said second electrode plate comprising a laminate of an insulator dielectric substrate and a plurality of separate electrodes consisting of a plurality of transversely-spaced-apart, longitudinally-extending strips of electrically-conducting material;

a first rigid dielectric, said first rigid dielectric comprising a plurality of laterally-spaced-apart, substantially-rigid, dielectric material separator strips which are disposed between each adjacent pair of said stack of vertically-spaced-apart, first electrode plate and said second electrode plate, thereby to separate said each adjacent pair of said vertically-spaced-apart first and second electrode plates, said substantially-rigid dielectric material separator strips being offset in different levels of said vertically-stacked sandwich, and being disposed to run parallel to one another in said different levels of said vertically-stacked sandwich, said substantially-rigid dielectric material separator strips thereby defining spaces into which at least one of said electrode plates may bend in response to an applied load, so that selected portions of said dielectric material separator strips are in contact with a substantially-horizontal electrode plate which is immediately above it in response to that applied load, and whereby a lower electrode is pressed against an upper electrode, causing capacitance of said mat to change; and a second fluid dielectric;

thereby to provide a capacitance transducer mat that has a significant linear response and an insignificant non-linear response.

22. The capacitance mat according to claim 21, wherein one or both of said first electrode and said second electrode-coated dielectric plate are flexible, thereby to enable them to press together.

23. The capacitance mat according to claim 21, wherein said first electrode plate and said second electrode plate have two opposing portions which are inclined with respect to one another, whereby an increasingly-greater area is produced as said electrode plates are pressed together and deflect towards one another.

24. The capacitance mat according to claim 23, wherein said inclined portions are provided by appropriate selection of material and dimensions of one or both of said first electrode and said second electrode to cause a linear increase in said effective area as said electrode are pressed together and deflect towards one another.

25. The capacitance mat according to claim 21, wherein one or both of said first electrode plate and said second electrode plate are constructed to bend towards one another, whereby oppositely-bending curves of each are pressed increasingly together by compression.

26. The capacitance mat according to claim 21, wherein said first electrode plate and said second electrode plate are constituted of different materials and thereby have different physical characteristics.

27. The capacitance mat according to claim 21, wherein said first electrode plate is coated with a thin layer of copper and wherein said second electrode plate is coated with a thin layer of transversely-spaced-apart, longitudinally-extending strips of aluminum, said second electrode plate having greater strength and thickness than said first electrode plate.

28. The capacitance mat according to claim 21, wherein said first rigid dielectric comprises a plurality of transversely-spaced-apart thin strips of dielectric material, the thickness of said thin strips of dielectric material being less than said distance between said first electrode plate and said second electrode plate.

29. The capacitance mat according to claim 28, wherein said plurality of transversely-spaced-apart, longitudinally-extending dielectric strips each have a substantially-constant thickness.

30. The capacitance mat according to claim 28, wherein said plurality of transversely-spaced-apart, longitudinally-extending dielectric strips each have a gradual change in thickness, thereby creating a desired effect on capacitance to balance or offset an undesired effect.

31. The capacitance mat according to claim 21, wherein a lower one of said electrode plates comprises a thin flexible sheet of synthetic plastics material on which thin films of transversely-spaced-apart, longitudinally-extending strips of copper have been deposited.

32. The capacitance mat according to claim 31, wherein a uniform film of copper has been first deposited, and said second electrode is then shaped by etching.

33. The capacitance mat according to claim 21, wherein said second fluid dielectric occupies the space between said first electrode plate and said second electrode plate when said first electrode plate and said second electrode plate are not pressed together, and whereby said second fluid dielectric may move into and out of said space as said first electrode plate and said second electrode plate deflect and resiliently deform.

34. The capacitance mat according to claim 21, wherein said capacitor transducer comprises a closed chamber.

35. The capacitance mat according to claim 34, wherein said second fluid dielectric comprises air.

36. The capacitance mat according to claim 34, wherein said second fluid dielectric comprises a compressible fluid, thereby to accommodate for any volume change which results from deflections of said first electrode plate and said second electrode plate.

37. The capacitance mat according to claim 34, wherein said second fluid dielectric comprises a vacuum.

38. A capacitance transducer comprising:

a first electrode and a second electrode, said first electrode and said second electrode having overlapping surface areas which are spaced apart by a first solid dielectric, said first solid dielectric comprising a plurality of transversely-spaced-apart thin strips of dielectric material, the thickness of said thin strips of dielectric material being less than the distance between said first electrode and said second electrode, and by a second fluid dielectric, said second fluid dielectric occupying the space between said first electrode, between said second electrode and between said first solid dielectric when said first electrode and said second electrode are not pressed together, and said second fluid dielectric being movable into and out of said space as said first electrode and said second electrode deflect and resiliently deform; and means for orienting said first electrode with respect to said second electrode so that increasing force which is applied to said transducer resiliently presses an increasing portion of overlapping surface areas of said first electrode and said electrode into closer proximity while being separated by said first solid dielectric strips and while substantially-simultaneously removing said second fluid dielectric from areas of close proximity, thereby to cause a capacitance response that depends significantly on the size of the areas which are pressed together relative to any capacitance response resulting from a change in the spacing of the electrodes, and wherein further portions of said first electrode which are not pressed close to said second electrode are farther from said second electrode, said further portions being separated from said second electrode by said first solid dielectric strips and also by said second fluid dielectric that occupies said space between said electrodes;

thereby to provide a capacitance transducer that has a significant linear response and an insignificant non-linear response.

39. The capacitance transducer according to claim 38, wherein said capacitance transducer comprises a closed chamber.

40. The capacitance transducer according to claim 39, wherein said second fluid dielectric comprises air.

41. The capacitance transducer according to claim 39, wherein said second fluid dielectric comprises a compressible fluid, thereby to accommodate for any volume change which results from deflections of said first electrode and said second electrode.

42. The capacitance transducer according to claim 39, wherein said second fluid dielectric comprises a vacuum.

* * * * *